United States Patent
Chao et al.

(10) Patent No.: US 6,807,483 B1
(45) Date of Patent: Oct. 19, 2004

(54) METHOD AND SYSTEM FOR PREDICTION-BASED DISTRIBUTED NAVIGATION

(75) Inventors: Yi-Chung Chao, Fremont, CA (US); HaiPing Jin, San Jose, CA (US); DongHai Dai, Fremont, CA (US)

(73) Assignee: Televigation, Inc., Sunnyvale, CA (US)

( * ) Notice: Subject to any disclaimer, the term of this patent is extended or adjusted under 35 U.S.C. 154(b) by 35 days.

(21) Appl. No.: 10/408,325

(22) Filed: Apr. 8, 2003

Related U.S. Application Data (60) Provisional application No. 60/417,956, filed on Oct. 11, 2002.

(51) Int. Cl.[7] ............................................. G01C 21/00
(52) U.S. Cl. ...................... 701/210; 701/201; 701/209; 340/995.12; 340/995.23
(58) Field of Search ................................. 701/201, 202, 701/207, 208, 209, 210, 211, 214; 340/991, 993, 995.12, 995.16, 995.17, 995.19, 995.25, 995.23, 995.27

(56) References Cited

U.S. PATENT DOCUMENTS

| | | |
|---|---|---|
| 5,902,350 A | 5/1999 | Tamai et al. |
| 5,904,728 A | 5/1999 | Tamai et al. |
| 5,910,177 A | 6/1999 | Zuber |
| 5,912,635 A | 6/1999 | Oshizawa et al. |
| 5,922,042 A | 7/1999 | Sekine et al. |
| 5,928,307 A | 7/1999 | Oshizawa et al. |
| 5,938,720 A | 8/1999 | Tamai |
| 6,073,075 A * | 6/2000 | Kondou et al. .............. 701/203 |
| 6,266,615 B1 | 7/2001 | Jin |
| 6,418,374 B2 * | 7/2002 | Sakamoto et al. .......... 701/209 |

* cited by examiner

*Primary Examiner*—Tan Q. Nguyen
(74) *Attorney, Agent, or Firm*—Irene Y. Hu (57) ABSTRACT

Method and system for prediction-based navigation in a real-time distributed navigation system. In one embodiment, a server receives a request from a client comprising one or more position coordinates. The server estimates the user's speed, estimates total elapsed time, calculates an optimal route to the destination and sends a set of routing directions to the client. Moreover, the server estimates a route origin within an estimated comfort zone in order to calculate the optimal route from the estimated origin to the destination.

38 Claims, 6 Drawing Sheets

METHOD AND SYSTEM FOR PREDICTION-BASED DISTRIBUTED NAVIGATION

CROSS-REFERENCE TO RELATED APPLICATIONS

This application relates to issued U.S. Pat. No. 6,266,615 entitled "Method And System For An Interactive And Real-Time Distributed Navigation System" by HaiPing Jin, issued on Jul. 24, 2001, herein incorporated in its entirety by reference.

RELATED APPLICATION

This application claims priority to U.S. provisional application Ser. No. 60/417,956 entitled "Prediction-based Positioning, Routing and Rerouting" filed Oct. 11, 2002.

BACKGROUND INFORMATION

1. Field of Invention

The present invention relates generally to navigation systems and location-based information delivery, and more particularly, to a method and system for prediction-based positioning and delivering real-time navigational information using distributed navigation information processing.

2. Description of Related Art

Presently, a rapid growth in technological fields such as the personal digital assistant (PDA) and cellular telephones has fueled consumer interest in products that provide on-call real-time guidance and communication. One such technological advance is a navigation system that allows its users to reach destinations by providing turn-by-turn instructions along a calculated route.

Conventional navigation systems are typically satellite-based global positioning system (GPS) devices which have been incorporated into automobile navigation systems, for additional information regarding conventional navigation systems, refer to U.S. Pat. Nos. 5,938,720, 5,928,307, 5,922,042, 5,912,635, 5,910,177, 5,904,728, 5,902,350, all incorporated herein by reference. Such conventional automobile navigation systems, however, are expensive and inconvenient to use. Therefore, there is a need to incorporate navigation capabilities so that a user may access real-time turn-by-turn route instructions via personal handheld devices such as a wireless cellular phone or a personal digital assistant (PDA) device.

Several technical obstacles prevent efficient use of navigation systems incorporated into personal handheld devices. One such obstacle is the amount of geographic data needed to provide reasonably detailed navigational information. Small handheld devices comprise limited embedded memory that may not be adequate for storing a large amount of geographic information essential for navigational purposes. This obstacle can be overcome in a distributed navigation system comprising a server-client structure, wherein the navigation functions are partitioned and assigned among one or more distributed servers and the handheld device or client.

However, unlike conventional real time navigation systems where routes or reroutes in cases of deviation can be calculated without the consideration of communication latency and other time delay effects, a distributed navigation system is plagued with uncertain latencies and other parameters that affect route calculation. For example, the latency incurred for both communication from the client to the server and from the server to the client must be taken into consideration for route calculation, as the server must predict a route origin location before calculating a route from the origin to the destination.

One additional parameter is the insufficient location accuracy provided by current technology. Initial sources of inaccuracy of the GPS based systems, for example, are affected by factors such as atmospheric and timing errors limiting the accuracy of a single GPS receiver to +/−50 meters. Inaccurate GPS information as well as other parameters such as road condition, traffic condition, and weather need to be considered in order to obtain a close approximation of the route origin location, and the origin may then be used to calculate an optimal route to the destination.

SUMMARY OF THIE INVENTION

The present invention provides a method and system for prediction-based navigation in a distributed navigation system. In one embodiment of the present invention, the system comprises a personal digital device (e.g. PDA, cellular telephone, etc.) or client and one or more servers communicating with the client via wireless carriers and the Internet.

A server obtains a user's initial position via the client and proceeds to estimate and aggregate a number of time delays such as incurred by communication between the server and the client. The server then determines a route origin location within an established comfort zone defined by a minimum and a maximum displacement from the user's initial position by estimating the user's speed and elapsed time since the initial position. The server establishes the comfort zone by taking into consideration a number of parameters such as speed limit or traffic condition, and estimates the route origin location within the comfort zone. The server subsequently calculates a route to the destination according to the estimated route origin location and the navigation system sends turn-by-turn instruction of the route to the user from the estimated route origin location to the destination.

BRIEF DESCRIPTION OF THE DRAWINGS

The accompanying drawings that are incorporated in and form a part of this specification illustrate embodiments of the invention and together with the description, serve to explain the principles of the invention.

DETAILED DESCRIPTION

The following description is presented to enable one of ordinary skill in the art to make and use the invention and is provided in the context of a patent application and its requirements. In the following description, specific nomenclature is set forth to provide a thorough understanding of the present invention. It will be apparent to one skilled in the art that the specific details may not be necessary to practice the present invention. Furthermore, various modifications to the embodiments will be readily apparent to those skilled in the art and the generic principles herein may be applied to other embodiments not necessarily enumerated herein. Thus, the present invention is not intended to be limited to the embodiments shown but is to be accorded the widest scope consistent with the principles and features described herein.

A key component of a navigation system is the determination of the location (or position) of a user. It is intended that the term location referred to herein comprises a geographic location or geographic information relating to the position of an object. A location may contain three-dimensional information that completely defines the exact position of an object. In some additional embodiments, a location may contain information that is not sufficient to completely define the position of an object. Broadly defined, as used herein, a location also may include speed, time, direction of movement, etc. of an object.

One skilled in the art would appreciate that the format with which a location is expressed is not critical to some embodiments of the invention. For example, in some embodiments, location information is presented in the format of (x, y), where x and y are two ordinates that define the geographic location, i.e., a position of a user. In an alternative embodiment, location information is presented by longitude and latitude related information. In another embodiment of the present invention, the location information also includes a velocity element comprising a speed component and a heading component.

Figure 1:
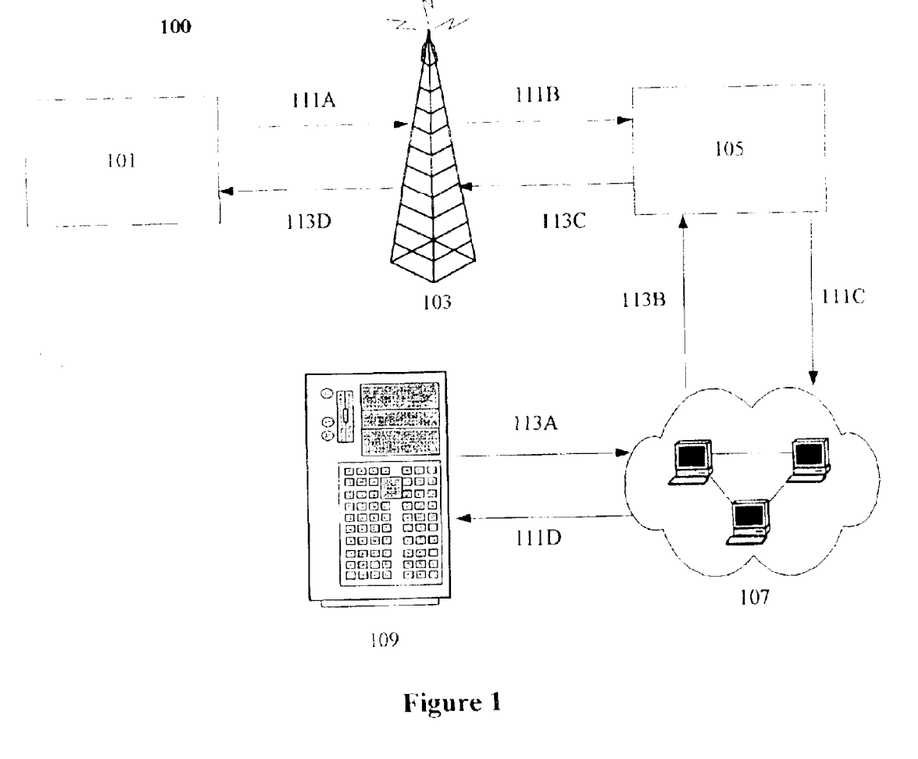
FIG. 1 is an architectural diagram illustrating an embodiment of an interactive real-time distributed navigation system.

FIG. 1 shows an architecture for an interactive real-time distributed navigation system in accordance to one embodiment of the present invention. The various components and their interaction will now be described. Wireless device 101 may take the form of a cellular telephone, satellite telephone, wireless Personal Digital Assistant (PDA), personal computer or other suitable device having wireless communications capability. Wireless device 101 is equipped with positioning capability that takes the form of, for example, global positioning systems (GPS), emergency 911 (E911) location, or some other positioning systems as they become available. One skilled in the art will appreciate that the present invention is not limited to any particular positioning technology. In one embodiment, wireless device 101 is manufactured with built-in positioning capabilities.

Wireless device 101 need not carry map information, or may carry some map information, depending on the designed storage capability of the wireless device 101. Such a system is described as a distributed system and will be further discussed below.

In one embodiment, the capabilities of wireless device 101 are enhanced through interfacing with modular attachments. A major function of wireless device 101 is to provide an interface between the invention and a user. Furthermore, as will be described more fully below, wireless device 101 provides a user interface for displaying graphical, textual or audible information. The user interface incorporates the user's sensory capabilities within the invention, allowing the user to interact with electromechanical components of the invention, such as by allowing the user to relay and receive location information by means of audible signals, voice, or audiovisual, graphical, or combination thereof of location information displayed or transmitted on wireless device 101. Where a text-displaying device is used, enhanced performance is achieved through wireless device 101 displaying several lines of text.

In another embodiment comprising an enhanced video display, wireless device 101 displays maps and enhanced directional information. In another embodiment, wireless device 101 is directionally oriented through gyroscopic or geomagnetical enhancements allowing wireless device 101 or server to provide real time location and orientation information. One skilled in the art realizes that many more implementations are possible for wireless device 101 without deviating from the teachings of this invention.

As further shown in FIG. 1 wireless carrier 103 provides wireless connectivity between wireless device 101 and distributed navigation servers 109 to be described further below. Examples of wireless carrier 103 include cellular telephone carriers, satellite communications carriers or global positioning system carriers. In achieving wireless connectivity, wireless carriers provide an existing infrastructure for the wireless devices and distributed navigation servers. Because of the adaptive interaction with the user, information ranging from general to very specific is relayed to the user for a wide range of navigation applications.

While keeping within the teachings of the invention, wireless carrier 103 provides positioning information such as through GPS, E911 or other positioning systems. Alternatively, positioning information is obtained through a third party means and is then used by wireless carrier 103. For example, wireless service resellers, wireless internet service providers (ISPs), or satellite wireless carriers, among others, provide the services necessary to practice the invention. In an embodiment of the invention, wireless carrier 103 receives and transmits analog or digital information from the wireless device 101 and directs such information downstream to other components of the invention. Similarly, wireless carrier 103 receives information from components of the invention and then directs such information to wireless device 101.

As shown in FIG. 1, wireless carrier 103 is connected to gateway 105 which provides an interface to network 107. Gateway 105 is provided by, among others, wireless carriers, ISPs, or other telecommunications providers. In one embodiment of the invention, network 107 is the Internet. The Internet provides advantages because it is a widely distributed network reaching many areas of the world. In another embodiment, network 107 is implemented as a proprietary network. By implementing a specialized network, network 107 may be customized to provide minimal latency and optimal performance.

As shown in FIG. 1, a plurality of distributed navigation servers 109 are incorporated as part of the invention by communicating via network 107. Distributed navigation servers 109 may comprise street map information, traffic, weather, and other navigation-related as well as points of interest information to facilitate accurate navigation and flexibility. In this manner, wireless device 101 is not burdened with carrying all the necessary information required to process proper navigation. In one embodiment, distributed navigation servers 109 also process location specific information such as real-time traffic information. In an alternative embodiment, traffic information may be obtained from a group of other service providers. By observing and comparing their positions, speeds and times, and making further comparisons with nominal street speed limits in a map database, real-time traffic information is generated and then used by the invention. At each juncture towards a destination, the system dynamically determines the optimal route for a particular user responsive to ever changing conditions. For example, where due to changed conditions a first route becomes less optimal, a second route is generated and presented to a user. An optimal route is determined in several ways depending on a user's preference. For example, an optimal route can be based on minimum time, minimum distance or minimum consumption of fuel. Processor intensive functions such as navigation guide algorithms are processed by distributed navigation servers 109 so as to reduce the computational burden on wireless device 101. As part of the processing function of distributed navigation servers 109, in one embodiment, these servers provide a conversion function such as between HDML or WML to HTML and vice versa.

Figure 2:
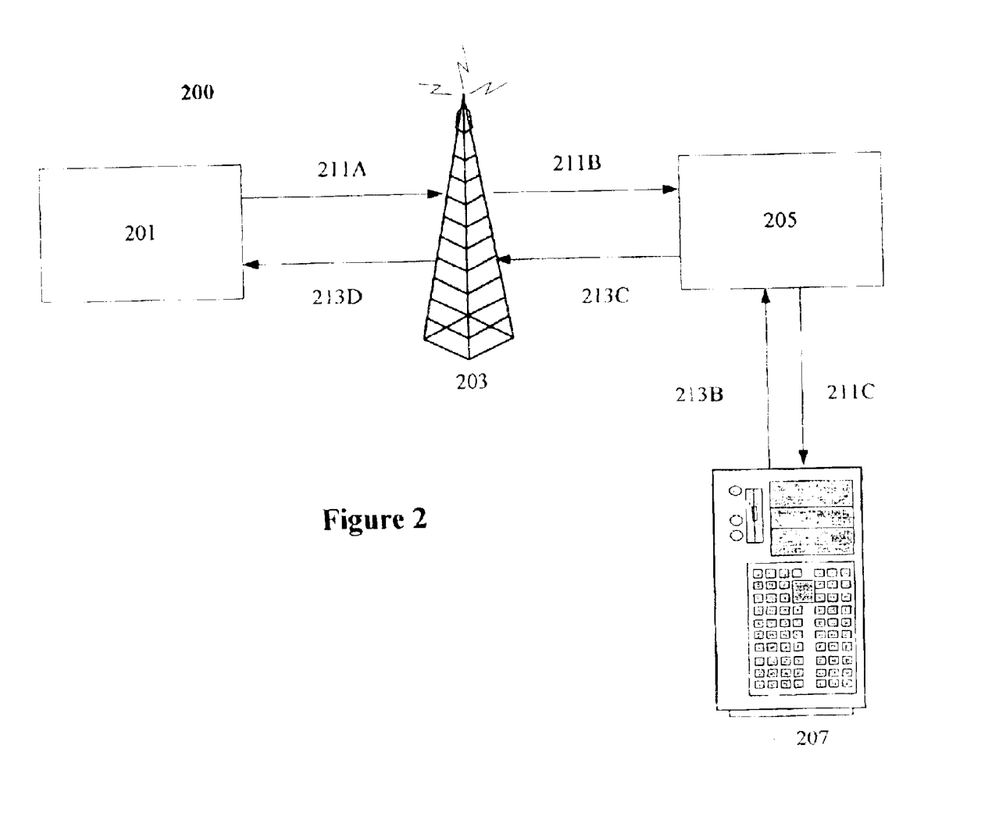
FIG. 2 is an architectural diagram illustrating an alternative embodiment of an interactive real-time distributed navigation system.

An alternative embodiment of the system architecture of the present invention is shown in FIG. 2. As shown in FIG. 2, wireless device 201, wireless carrier 203 and distributed navigation servers 207 are substantially similar to as described for FIG. 1. Direct links 205, however, provide an alternative embodiment to the function of gateway 105 and network 107 of FIG. 1. The direct link architecture is applicable where Internet infrastructure is not well established or fast response is desired for user navigation or other location specific information services. Illustratively, TI, Frame Relay, etc. linked by a LAN or WAN are appropriate for direct link 205. In another embodiment, direct links 205 may be implemented as hard wired connections between wireless carrier 203 and distributed navigation servers 207 where wireless carrier 203 and distributed navigation servers 207 are collocated in a central office.

Figure 3:
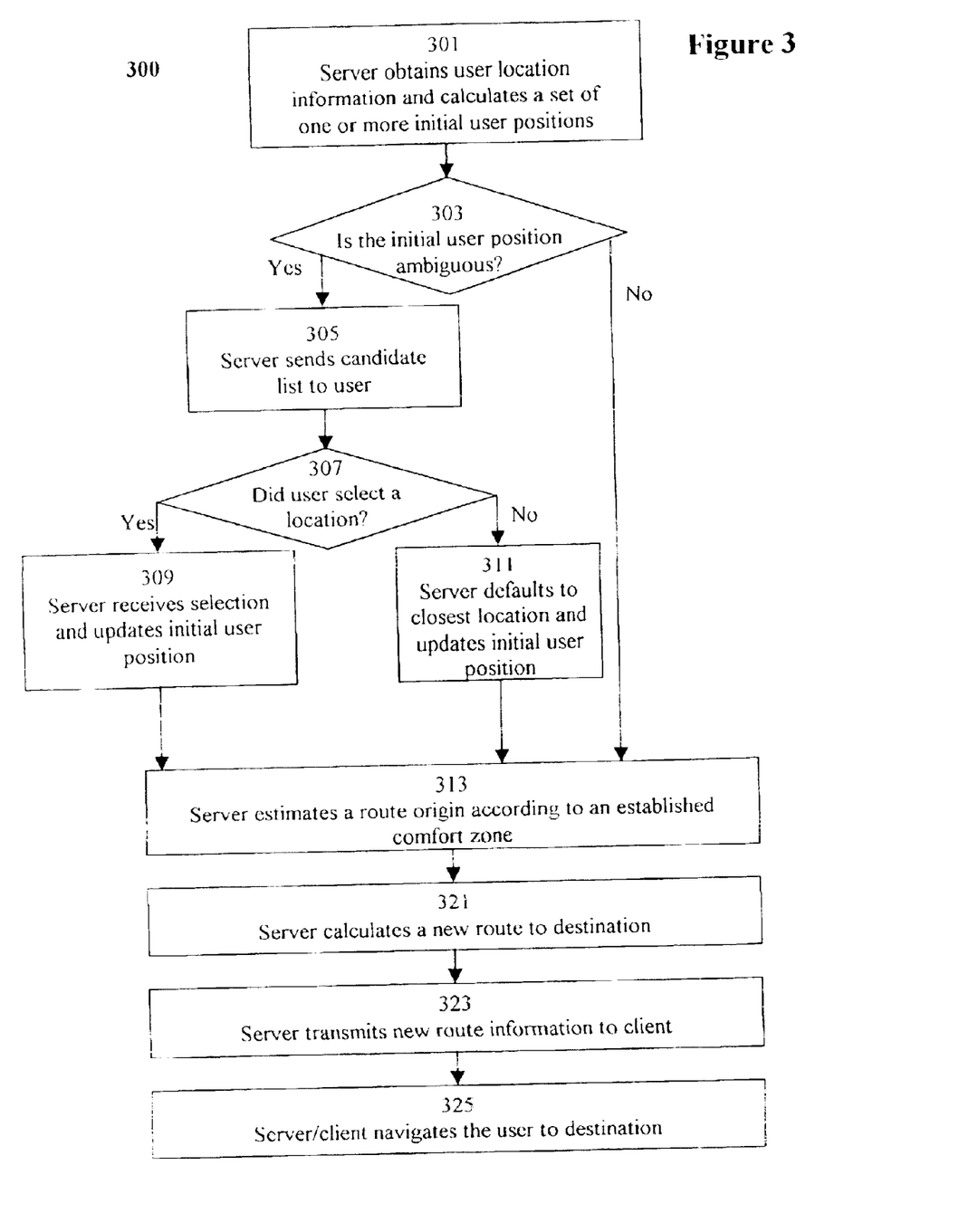
FIG. 3 is an illustrative flow chart showing the steps for route calculation in a real-time distributed navigation system according to one embodiment of the present invention.
Figure 4:
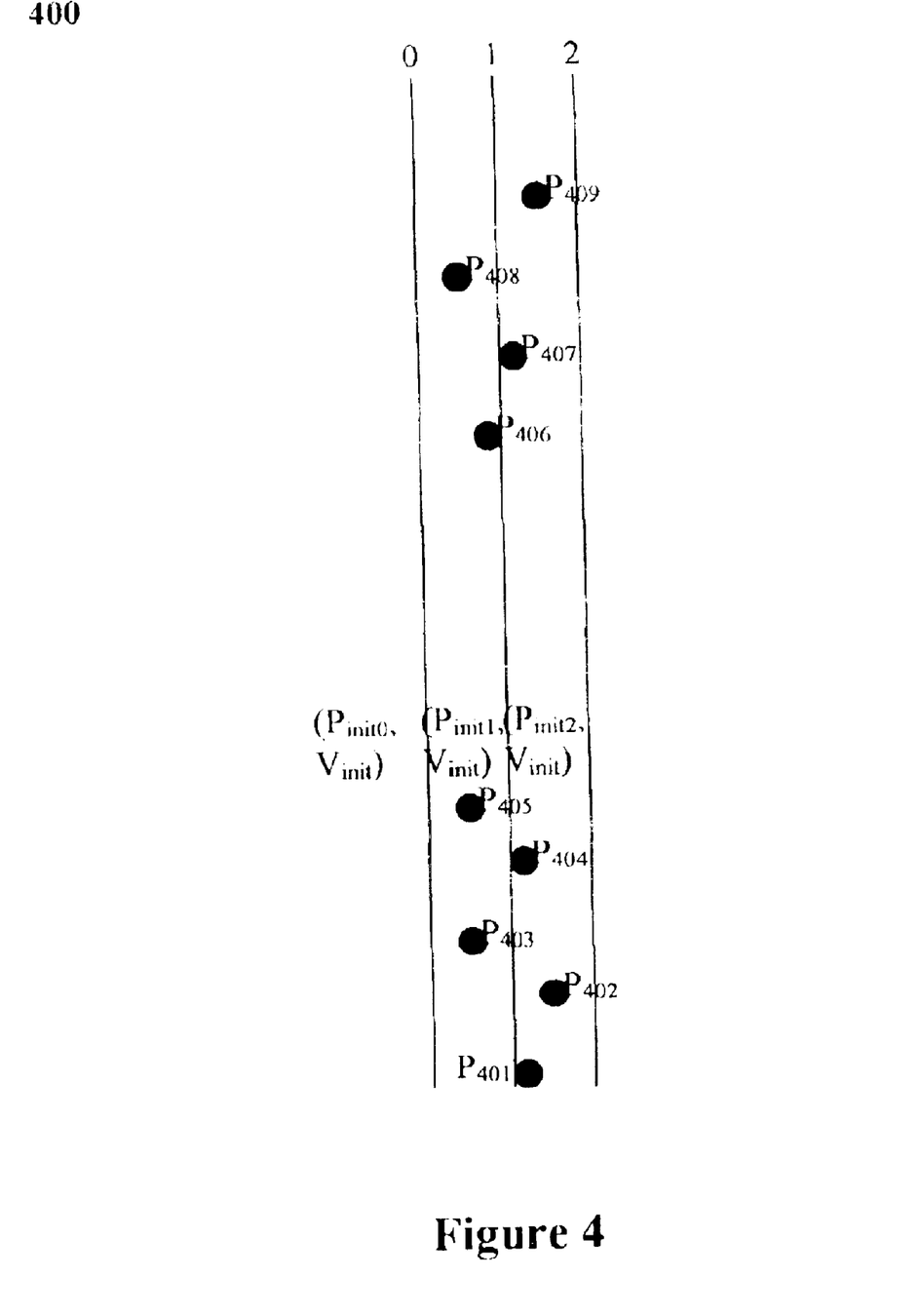
FIG. 4 is a diagram of two sets of position coordinates illustrating a resolution for user initial position ambiguity according to one embodiment of the present invention.

FIG. 3 illustrates one embodiment of the prediction-based navigation steps for route calculation in a real-time distributed navigation system according to one embodiment of the present invention. In step 301, a server obtains from a client a set of preliminary user location information sent along with a request for navigation instructions. In one embodiment, a client comprises a device such as wireless device 101 discussed with reference to FIG. 1. The server comprises a device such as distributed navigation server 109 also discussed with reference to FIG. 1. Moreover, preliminary user position information received at the server may be expressed in one of several formats, such as position fixes, i.e., in the form of latitude and longitude measurements. In one embodiment, the preliminary user information includes position fixes hereafter also known as position coordinates such as $P_0$, $P_1$, $P_2$, $P_3$, and $P_4$ shown in FIG. 6, each position coordinate having an associated time component, $t_0$, $t_1$, $t_2$, $t_3$, and $t_4$. The client queries a positioning system, such as a GPS system, to acquire these position coordinates associated with the user from a time interval $t_0$ to $t_n$, wherein the time intervals in this example runs from $t_0$ to $t_4$. Having received a set of user position coordinates $P_0$, $P_1$, . . . $P_n$, the server then determines a corresponding set of preliminary, or initial, user positions coordinates $P_{init0}$, $P_{init1}$, . . . $P_{initn}$. In one embodiment, the user location information further comprises an initial user velocity $V_{init}$ such as shown in FIG. 4 including a user speed and a heading. In another embodiment, the user location information does not comprise an initial user velocity and the server estimates a user velocity according to the acquired position coordinates and the corresponding time components. As is further described below, a route origin location such as origin denoted O shown in FIG. 6 for navigation purposes is then determined within a defined comfort zone.

Figure 6:
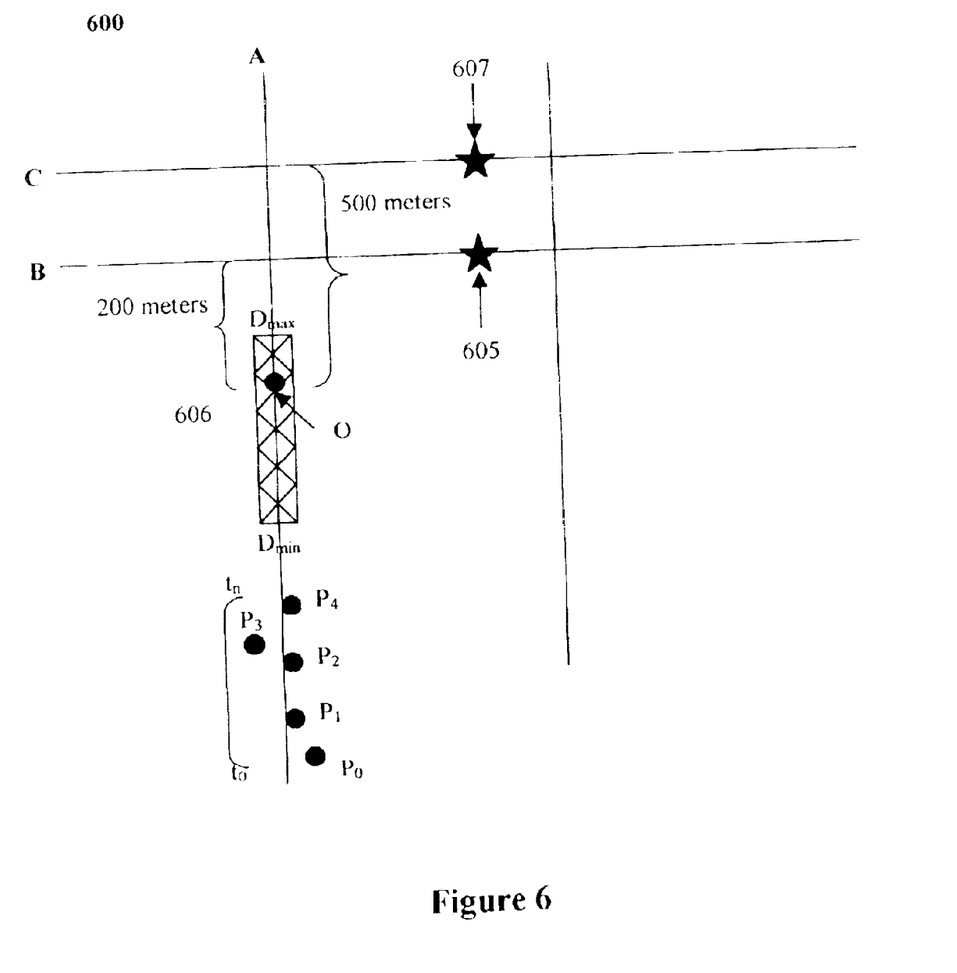
FIG. 6 illustrates from a relative time perspective the extrapolation of the various estimated user location using the comfort zone as referenced in steps of FIG. 3.

Referring now back to FIG. 3, at step 303 a determination is made as to whether the initial user position is ambiguous. In one embodiment, the initial user position $P_{init}$ such as shown in FIG. 6 is not ambiguous and the set of initial user positions comprises a single position coordinate. A location contains various degrees of inaccuracies. For example, most GPS receivers can provide location information accurate to within a range of approximately 50 meters, i.e., an inaccuracy of around 50 meters. There are a number of known factors that may affect the accuracy of a location determination. For instance, weather conditions may affect the accuracy of a GPS location determination. In one embodiment of the invention, a location, in addition to information defining the position of an object, is also associated with an estimated error range. One skilled in the art appreciates that the error of a positioning system is estimated based upon the characteristics of the positioning device and other factors including weather and transmission conditions. Therefore, whether or not a location is ambiguous may be dependent upon many factors including, but not limited to: the accuracy associated with the location; attributes of a road network; recent traveling history; and map accuracy.

FIG. 4 illustrates a first set of position coordinates $P_{401}$, $P_{402}$, $P_{403}$, $P_{404}$, and $P_{405}$, acquired by the server such as in step 301 of FIG. 3, wherein if the initial user position $P_{init}$ is determined as ambiguous and the server queries a map database to generate a candidate list comprising candidate road locations denoted as options 0, 1, and 2, and generates a set of initial user position coordinates comprising $P_{init0}$, $P_{init1}$, and $P_{init2}$ corresponding to locations 0, 1, and 2 respectively. The server then sends the candidate list to the user via the client at step 305 of FIG. 3. Moreover, in one embodiment, the client periodically sends updated user location information to the server, and the server updates the current user location information accordingly. For example, user position coordinates $P_{406}$, $P_{407}$, $P_{408}$, and $P_{409}$ in FIG. 4 are updated location coordinates of the user sent from the client to the server, the server receives the updated coordinates as the user deliberates the candidate list. If the user selects one of the locations 0, 1, or 2 following step 309 of FIG. 3, the server updates to a new initial user position $P_{init}$ in step 309 according to the user's location selection, the initial user position corresponding to the selected location, and the current position coordinates such as $P_{406}$, $P_{407}$, $P_{408}$, and $P_{409}$. If the user does not select from the list of candidate locations within an allotted timeout period, in step 311, the server estimates a most probable location selection from the list of roads and selects the most probable location as the road on which the user travels, the estimation may be based on pattern recognition analysis, user's travel history and like parameters. For further information related to ambiguity determination, ambiguity reduction, and user location selection, refer to U.S. Pat. No. 6,266,615 entitled "Method And System For An Interactive And Real-Time Distributed Navigation System" by HaiPing Jin, filed on Jul. 24, 2001, herein incorporated in its entirety by reference. Once a default location is selected, the server then updates to a new initial user position $P_{init}$ in step 311 according to the selected default road, the initial user position corresponding to the default selection, and the current position coordinates such as $P_{406}$, $P_{407}$, $P_{408}$, and $P_{409}$. In one embodiment of the invention, the candidate locations of step 305 are associated with notorious attributes such as landmarks, buildings, street intersections or street names, etc. One of skill in the art appreciates that various types of database structures can be useful for implementation with an embodiment of the invention.

Referring now back to step 303 of FIG. 3, if it is determined that there is no ambiguity in user location, or if any ambiguity is resolved, the server in step 313 calculates a route origin such as O shown in FIG. 6 within an established comfort zone such as comfort zone 606 shown in FIG. 6 defined by a minimum displacement $D_{min}$ from the initial user position $P_{init}$ and a maximum displacement $D_{max}$ from the initial user position $P_{init}$, wherein the route origin location O, defined as the start point from which navigation instructions is estimated within defined comfort zone 606. Moreover, in the embodiment shown in FIG. 6, user initial position coordinate $P_{init}$ is estimated to be the same as the last position coordinate $P_4$ of the set of position coordinates included in the user location information. In an alternative embodiment, the initial user position coordinate $P_{init}$ is calculated according to user travel history, the set of position coordinates included in the user location information and like parameters, and may not be the same as the last position coordinate in the set of position coordinates. The comfort zone may be established by estimating elapsed time, estimating a user speed, and may take into consideration one or more environment factors such as speed limit of the road or weather conditions. The elapsed time includes all delays from when the client sends a request to a positioning system for the user's location to when the client receives route information calculated by the server.

Examples of time delays include, but are not limited to: measurement delay, downlink delay, uplink delay, server processing delay, and client processing delay. The measurement delay relates to a time period in which the client interacts with a positioning system such as GPS or E911. The time period may include, but is not limited to information processing time associated to the positioning system as the system obtains user's location and delay associated to the client as it collects location data from the positioning system. In an embodiment of the invention, the server estimates the measurement delay empirically by collecting time data between the client and the positioning system. In another embodiment of the invention, the server estimates the measurement delay by approximating a constant time delay that may be updated periodically.

The downlink delay relates to a time period starting from when the client sends a request for navigation from the user's initial position to when the server receives the request from the client. In an embodiment of the invention, the downlink comprises one or more segments such as illustrated by segments 111A, 111B, 111C, and 111D shown in FIG. 1, the aggregate transmission time as the client's request travels from one component of the navigation system shown in FIG. 1 to the next via segments 111A, 111B, 111C, and 111D is the downlink delay in an embodiment of the present invention. In an embodiment of the invention, each component of the navigation system maintains time according to a synchronized clock, and the server maintains a record of the time when the request sent from the client is received. Moreover, the request comprises a time stamp of the time when the client sent the request, and the server can then calculate the downlink delay by calculating the time differential between the time when the request is sent from the client and when the request is received at the server.

The uplink delay relates to a time period starting from when the server sends route information to the client to when the client receives the route information from the server. In an embodiment of the invention, the uplink comprises one or more segments such as illustrated by segments 113A, 113B, 113C, and 113D shown in FIG. 1, the aggregate transmission time as the client's request travels from one component of the navigation system shown in FIG. 1 to the next via segments 113A, 113B, 113C, and 113D is the uplink delay in an embodiment of the present invention. In an embodiment of the invention, the server estimates the uplink delay empirically by collecting transmission time data from the server to the client. In another embodiment of the invention, the server estimates the uplink delay with the assumption that the uplink delay is symmetric to the downlink delay.

The server processing delay relates to a time period in which the server calculates the route from the user location to the destination obtained from the request. The server determines an optimal route to the destination, the optimal route may be defined based on the user's request. For example, it can be either time or gas consumption which will be minimized. In an embodiment of the invention, the server processing delay is estimated empirically by collecting server processing time data and calculating a plurality of server processing delays corresponding to parameters such as server load.

The client processing delay relates to a time period in which the client communicates to and from the positioning system to obtain user location data. In an embodiment of the invention, the server estimates the client processing delay empirically by collecting client processing time data as the client interacts with the positioning system.

In one embodiment of the present invention, the time period between when the server estimates a user initial position $P_{init}$ to when the client receives routing instructions from the server is calculated by aggregating all time delays, for example:

Elapsed Time=Estimated Measurement Delay+Estimated Downlink Delay+Estimated Uplink Delay+Estimated Server Processing Delay+Estimated Client Processing Delay+ . . . [any additional delays]  Equation 1

Furthermore, in one embodiment, the server acquires an initial user velocity $V_{init}$ along with position coordinates in step 301 and extracts a user speed $S_u$ from the speed component of the velocity. In another embodiment, the server calculates the user speed according to the location information obtained in step 301. In an embodiment, the server estimates a user speed $S_u$ according to the one or more acquired position coordinates and corresponding time components.

The comfort zone is established to approximate a route origin location before determining a preferred route to the user's requested destination. The proximate displacement values of the comfort zone depend on the estimated elapsed time, estimated user speed, and various other factors such as traffic condition, weather, and the like. A method applied in an embodiment of the navigation system for establishing a comfort zone will be further discussed below.

The server establishes a comfort zone 606 according to several factors which may include, but not limited to: user location information relayed in the request from the client, nominal speed limit of the street on which the user is traveling, traffic signals, traffic condition, weather condition, visibility, and road connectivity.

Referring now back to FIG. 3, the comfort zone calculated in step 313 is defined by a minimum and a maximum displacement $D_{min}$ and $D_{max}$ respectively, from the user's initial position location $P_{init}$ (see FIG. 6). In an embodiment, the minimum displacement is calculated as shown below:

$$D_{min}=P_{init}+F_{min}*S_u*\text{Elapsed Time} \quad \text{Equation 2}$$

wherein $F_{min}$ is further defined in Equation 4.

Furthermore, the maximum displacement is calculated as shown below:

$$D_{max} = P_{init} + F_{max} * S_u * \text{Elapsed Time} \quad \text{Equation 3}$$

wherein $F_{max}$ is further defined in Equation 5.

Once the server establishes a comfort zone bounded by $D_{min}$ and $D_{max}$, a route origin O (see FIG. 6) can be estimated within the comfort zone. In an embodiment, the server designates the route origin by subtracting a constant percentage of the displacement between $D_{min}$ and $D_{max}$ from $D_{max}$. In another embodiment, the server estimates the route origin by applying pattern recognition analysis to the user's recent travel history to empirically determine a value less than $D_{max}$ to produce an estimate of the route origin. The server calculates a new route and relays the route information to the client at steps 321 and 323 once an estimation of the route origin is made at step 319.

In an embodiment of the present invention, the factor $F_{min}$ in Equation 2 is representative of driving factors calculated as shown below:

$$F_{min} = f(\text{Road Speed Limit}, W1min)*f(\text{Traffic Conditions}, W2min)*f(\text{Traffic Signals}, W3min)*f(\text{Weather}, W4min)*f(\text{Visibility}, W5min)* \ldots \quad \text{Equation 4}$$

wherein factors such as road speed limit may be constants in a database associated with identified road according to databases such as a map database. Each factor f also having an associated adjustable weight W1min, W2min, . . . Wnmin. Moreover, Equation 4 is illustrative of only one embodiment of the present invention, in an alternative embodiment, addition rather than multiplication may be used to calculate $F_{min}$. In an embodiment of the present invention, the factor $F_{max}$ in Equation 3 is representative of driving factors calculated as shown below:

$$F_{max} = f(\text{Road Speed Limit}, W1max)*f(\text{Traffic Conditions}, W2max)*f(\text{Traffic Signals}, W3max)*f(\text{Weather}, W4max)*f(\text{Visibility}, W5max)* \ldots \quad \text{Equation 5}$$

wherein factors such as road speed limit may be constants in a database associated with identified road according to databases such as a map database. Each factor also having an associated adjustable weight W1max, W2max, . . . Wnmax. Moreover, Equation 5 is illustrative of only one embodiment of the present invention, in an alternative embodiment, addition rather than multiplication may be used to calculate $F_{max}$.

Figure 5:
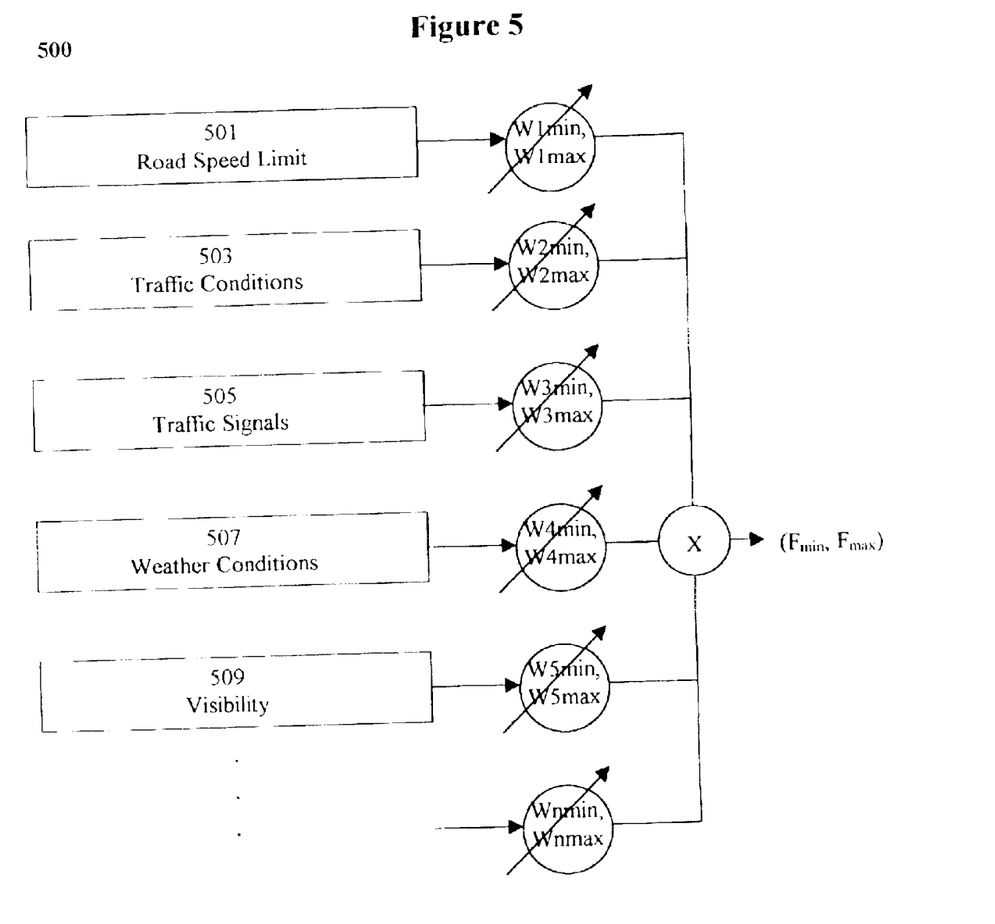
FIG. 5 is a diagram illustrating numerous parameters that contribute to a minimum and a maximum displacement factor from the user's initial position according to one embodiment of the present invention.

In an embodiment of the invention illustrated in FIG. 5, the server approximates the reliability and/or likelihood of the factors such as road speed limit illustrated in FIG. 5 and applies a minimum adaptive weight system wherein different weights such as denoted by W1min, W2min, W3min, W4min, W5min, to Wnmin in FIG. 5 are assigned to each factor correspondingly. The minimum adaptive weight system shown in FIG. 5 is assigned to the factors shown in FIG. 5 in order to generate the factor $F_{min}$ in Equation 4 for estimating the minimum displacement used to define the comfort zone.

Furthermore, the server approximates the reliability and/or likelihood of the factors such as road speed limit illustrated in FIG. 5 and applies a maximum adaptive weight system wherein different weights such as denoted by W1max, W2max, W3max, W4max, W5max, to Wnmax in FIG. 5 are assigned to each factor. The maximum adaptive weight system shown in FIG. 5 are assigned to the factors shown in FIG. 5 in order to generate the factor $F_{max}$ in Equation 5 for estimating the maximum displacement used to define the comfort zone.

The weights shown in FIG. 5 are assigned to estimate a minimum and a maximum displacement from the user's initial position location. For example, the reliability of user location relayed in step 301 of FIG. 3 from the client may be greater or lesser depending on various factors such as the environment in which the user is traveling. In an embodiment, the server determines the environment in which the user travels by querying a map database according to the relayed location information. In another embodiment, the relayed location information is associated with an estimated error and a range. As an example, the user is traveling on a highway in a remote area without any exits, the location information relayed from such an environment comprises little noise and is therefore relatively reliable. In contrast, if the user is traveling within a business district of a downtown urban area where a multitude of high-rise structures may impair the accuracy of the positioning system, the relayed location information including speed is relatively unreliable. Correspondingly, in one example, the road speed limit 501 in FIG. 5 may be assigned a maximum weight W1max of 0.8 for highway conditions where the relayed location information including speed is relatively reliable and the speed limit 501 in FIG. 5 may be assigned a minimum weight W1min of 0.3 for business district conditions where the relayed location information including speed is relatively unreliable.

In an embodiment of the present invention, factors such as weather and visibility are relayed along with user location information from the client and are correspondingly assigned weights. In another embodiment, the server may acquire weather information and/or visibility information via a weather database and/or a visibility database. In an embodiment of the invention, relatively poor weather or visibility may be assigned weights of 0.2 for W4min and W5min respectively in FIG. 5 while relatively good weather or visibility may be assigned weights of 1 for W4max and W5max respectively in FIG. 5. In another embodiment of the present invention, the weather and/or visibility information cannot be directly obtained and the server may generate weights according to empirical data collected for the environment in which the user travels.

In another embodiment of the invention, the server estimates the number of traffic lights the user will encounter from the time location information is relayed to the time the client receives the route information. In one embodiment of the invention, the server estimates the user's location when the client receives the route information in a best case scenario where the user is not stopped by any traffic signal and a worst case scenario where the user is stopped at each traffic signal. In this embodiment, the best case scenario is assigned the weight W3max for maximum displacement and the worst case scenario is assigned the weight W3min for minimum displacement.

In an embodiment of the invention, the one or more factors shown in FIG. 5 are not taken into consideration for estimating the route origin. In this embodiment, an optimal route origin may be calculated as shown below:

$$O_{optimal} = D_{min} = D_{max} = P_{init} + S_n * \text{Elapsed Time} \quad \text{Equation 6}$$

Referring now back to FIG. 3, at step 325, the server or the client navigates the user from the estimated route origin to the destination. Moreover, navigational tasks may be distributed between the server and the client in various embodiments. In one embodiment of the invention, depending upon the capability of the client device, data storage and navigation calculation load are dynamically distributed between the server and the device. In another embodiment of the invention, the user sends a request to navigate from a location (or point A) to point B, after receiving the request (including the destination point B) and user's location, the system of the present invention generates a global navigation route across several small geographic areas. The server then sends navigational information relating to a first small geographic area to the user's device. Once the user moves out of the first small geographical area, the information will be updated by the server either at the request of the user's device or initiated by the server based upon the location of the user. In yet another embodiment where the client device possesses ample storage and processing capabilities, the server sends all information related to the route to the client, and the client processes all location and route information in order to instruct the user turn-by-turn in real-time. In the mean time, the communication link between the client and server can be released to reduce the server traffic.

FIG. 6 illustrates an example comprising a set of position coordinates, a comfort zone, a route origin, and two destinations according to one embodiment of the present invention. The position coordinates $P_1$, $P_2$, $P_3$, $P_4$, and $P_5$ sent from the client to the server are shown in FIG. 6, and the server establishes a comfort zone 606 bounded by estimated $D_{min}$ and $D_{max}$. $D_{min}$ and $D_{max}$ are estimated with the estimated elapsed time, estimated user speed, and $F_{min}$ and $F_{max}$ shown in FIG. 5. The server then estimates the route origin within comfort zone 606 and the estimated route origin is denoted by O in FIG. 6. In an embodiment, the client sends a request for navigation to destination 605. The client receives route information from the server at origin O, and determines that the user will turn right to reach destination 605 in approximately 200 meters, the client then immediately sends a turning instruction either by voice or text, such as "you will make a right turn in approximately 200 meters on street X" to the user. In another embodiment, the client sends a request for navigation to destination 607. The client receives route information from the server at origin O, and determines that the user will turn right to reach destination 607 in approximately 500 meter, the client may then wait for a time period to lapse before sending a turning instruction either by voice or text to the user, the client delays sending the instruction in order to instruct the user turn-by-turn without overloading the user with premature instructions.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the arts to best utilize the invention and various embodiments with various modifications as are suited to the particular use contemplated. It is intended that the scope of the invention be defined by the Claims appended hereto and their equivalents.

For example, in a further embodiment, where wireless device 101 is equipped with directional capabilities such as through the use of gyroscope or geomagnetic sensing, the system provides real-time directional as well as navigational information. Illustratively, the system determines that the user must proceed north and the user is facing north, a device displays an upward pointing arrow indicating that the user should proceed straight ahead. However, where the user must proceed north and he is facing south, the device display shows a downward pointing arrow indicating that the user should proceed backward or, more reasonably, turn around to face north and then proceed. In another implementation with a more enhanced display, more detailed and broader map information is displayed with more stylistic prompts to the user.

The invention further allows for the wireless device to be connected to an accessory display. For example, a wireless device 101 appropriate for walking is enhanced by interfacing with a device with additional features such as a car-mounted display or portable computer to become better equipped for automobile navigation. In certain embodiments of the invention, the accessory device provides, without limitation, enhanced display capabilities enhanced memory capacity, increased computational power, or increased throughput.

We claim:

1. A prediction-based navigation method in a distributed system comprising a client and a remote server, wherein the steps of providing prediction-based distributed navigation by the client comprises:

sending a request for a set of routing information to the server by the client, wherein the request comprises sending a set of position coordinates;

estimating an initial user position in response to receiving the client request and the set of position coordinates;

calculating a comfort zone range wherein the comfort zone range comprises a minimum and a maximum displacement value, wherein the minimum displacement is defined by a minimum weighted function, an initial user speed, and an estimated elapsed time, and the maximum displacement of the comfort zone range is defined by a maximum weighted function, the initial user speed, and the estimated elapsed time; and generating a new set of routing information to a destination requested by the user using the calculated comfort zone range to estimate a route origin and accessing one or more databases to determine a set of routing directions from the estimated route origin to the destination.

2. The prediction-based distributed navigation method of claim 1 wherein each position coordinate comprises a corresponding time component.

3. The prediction-based distributed navigation method of claim 2, wherein the request for routing instructions further comprises an initial user velocity having a speed component and a heading component.

4. The prediction-based distributed navigation method of claim 3, wherein the initial user speed is derived from the initial user velocity.

5. The prediction-based distributed navigation method of claim 2, wherein an initial user velocity comprising a speed component and a heading component is derived from the set of position coordinates and corresponding time components.

6. The prediction-based distributed navigation method of claim 2, wherein an initial user speed is derived from the set of position coordinates and associated time components.

7. The prediction-based distributed navigation method of claim 1 wherein the maximum and minimum weighted functions comprise one or more weighted factors from a set of one or more weighted factors comprising a speed limit factor, a road condition factor, a traffic condition factor, a traffic signal factor, a weather factor, and a visibility factor.

8. The prediction-based distributed navigation method of claim 7 wherein each weighted factor comprises a variable multiplier.

9. The prediction-based distributed navigation method of claim 1 wherein the step of estimating the initial user position comprises providing the client a list of candidate locations to receive user selection input.

10. The prediction-based distribution navigation method of claim 1 wherein the step of estimating the initial user position comprises using a global positioning system in conjunction with the set of position coordinates.

11. The prediction-based distribution navigation method of claim 1 wherein the client communicates with the server via a wireless network.

12. The prediction-based distribution navigation method of claim 1 wherein the step of the server generating the new set of routing information comprises the server accessing one or more databases via a network.

13. The prediction-based distribution navigation method of claim 1 wherein the one or more databases accessed comprises a map database, a weather database, or a traffic database.

14. A prediction-based navigation method in a distributed system comprising a client and a remote server, wherein the steps of providing prediction-based distributed navigation by the client comprises:
   a) sending a request for a set of routing information to the server by the client, wherein the request comprises sending a set of position coordinates;
   b) estimating an initial user position in response to receiving the client request and the set of position coordinates;
   c) determining if the initial user position is ambiguous;
   d) if the initial user position is not ambiguous, calculating a comfort zone range wherein the comfort zone range comprises a minimum and a maximum displacement value, wherein the minimum displacement is defined by a minimum weighted function, an initial user speed, and an estimated elapsed time, and the maximum displacement of the comfort zone range is defined by a maximum weighted function, the initial user speed, and the estimated elapsed time; and
   e) generating a new set of routing information to a destination requested by the user using the calculated comfort zone range to estimate a route origin and accessing one or more databases to determine a set of routing directions from the estimated route origin to the destination.

15. The prediction-based distributed navigation method of claim 14 wherein each position coordinate comprises a corresponding time component.

16. The prediction-based distributed navigation method of claim 15, wherein the request for routing instructions further comprises an initial user velocity having a speed component and a heading component.

17. The prediction-based distributed navigation method of claim 16, wherein the initial user speed is derived from the initial user velocity.

18. The prediction-based distributed navigation method of claim 15, wherein an initial user velocity is derived from the set of position coordinates and corresponding time components.

19. The prediction-based distributed navigation method of claim 15, wherein an initial user speed is derived from the set of position coordinates and associated time components.

20. The prediction-based distribution navigation method of claim 15, wherein the initial user position is ambiguous, further comprising the step of sending a list of candidate locations to the user for selection.

21. The prediction-based distribution navigation method of claim 20, wherein the user selects a location from the list of candidate locations.

22. The prediction-based distribution navigation method of claim 21, wherein the client periodically acquires a set of most recent user position coordinates and sends the position coordinates to the server.

23. The prediction-based distribution navigation method of claim 22, wherein the server updates the user initial position to a new value according to the user-selected location from the list of candidate locations and the most recently acquired position coordinates from the client.

24. The prediction-based distribution navigation method of claim 20, wherein the user does not select a location from the list of candidate locations within an allotted timeout period.

25. The prediction-based distribution navigation method of claim 24, further comprising the step of selecting a location from the candidate list as a default selection.

26. The prediction-based distribution navigation method of claim 25, wherein the client periodically acquires a set of most recent user position coordinates and sends the position coordinates to the server.

27. The prediction-based distribution navigation method of claim 26, wherein the server updates the user initial position to a new value according to the default location selection from the list of candidate locations and the most recently acquired position coordinates from the client.

28. A prediction-based distributed navigation system comprising:
   a client for sending a request for a set of routing information, wherein the request comprises sending a set of position coordinates; and
   a server for receiving the request from the client, calculating a comfort zone range wherein the comfort zone range comprises a minimum and a maximum displacement value, and generating a new set of routing information to a destination requested by the client using the calculated comfort zone range to estimate a route origin and accessing one or more databases to determine a set of routing directions from the estimated route origin to the destination.

29. The prediction-based distributed navigation system of claim 28, further comprising a wireless carrier coupled to the client on a first end for receiving the request from the client and coupled to the server on a second end for relaying the request from the client to the server.

30. The prediction-based distributed navigation system of claim 29, further comprising one or more direct links coupled to the wireless carrier on a first end for receiving the request from the wireless carrier and coupled to the server on a second end for relaying the request from the wireless carrier to the server.

31. The prediction-based distributed navigation system of claim 29, further comprising a gateway coupled to the wireless carrier on a first end for receiving the request from the wireless carrier and coupled to the server on a second end for relaying the request from the wireless carrier to the server.

32. The prediction-based distributed navigation system of claim 31, further comprising a network coupled to the gateway on a first end for receiving the request from the gateway and coupled to the server on a second end for relaying the request from the gateway to the server.

33. A prediction-based distributed navigation system comprising:
   a server for receiving a navigation request, calculating a comfort zone range wherein the comfort zone range comprises a minimum and a maximum displacement value, generating a new set of routing information to a requested destination using the calculated comfort zone range to estimate a route origin and accessing one or more databases to determine a set of routing directions from the estimated route origin to the destination; and a client for receiving the set of routing directions from the server.

34. The prediction-based distributed navigation system of claim 33, further comprising one or more direct links coupled on a first end to the server for receiving the routing directions and coupled on a second end to the client for relaying the routing directions.

35. The prediction-based distributed navigation system of claim 34, further comprising a wireless carrier coupled on a first end to the direct links for receiving the routing directions and coupled on a second end to the client for relaying the routing directions.

36. The prediction-based distributed navigation system of claim 33, further comprising a network coupled on a first end to the server for receiving the routing directions and coupled on a second end to the client for relaying the routing directions.

37. The prediction-based distributed navigation system of claim 36, further comprising a gateway coupled on a first end to the network for receiving the routing directions and coupled on a second end to the client for relaying the routing directions.

38. The prediction-based distributed navigation system of claim 37, further comprising a wireless carrier coupled on a first end to the gateway for receiving the routing directions and coupled on a second end to the client for relaying the routing directions.

* * * * *